United States Patent Office 3,707,572
Patented Dec. 26, 1972

3,707,572
DIHALOGENATION OF ALKYLDECAHYDRO-NAPHTHALENES

Abraham Schneider, Overbrook Hills, Pa., assignor to Sun Oil Company, Philadelphia, Pa.
No Drawing. Continuation-in-part of application Ser. No. 702,789, Feb. 5, 1968. This application Dec. 9, 1969, Ser. No. 886,797
The portion of the term of the patent subsequent to Dec. 23, 1986, has been disclaimed
Int. Cl. C07c 17/10, 23/36
U.S. Cl. 260—648 R       16 Claims

ABSTRACT OF THE DISCLOSURE

Alkyldecahydronaphthalenes having one or more unbranched alkyl substituents of 1–3 carbon atoms each are dichlorinated or dibrominated by reacting the same under homogeneous conditions and at —30° C. to 20° C. with a $C_4$–$C_5$ tertiary alkyl chloride or bromide, using as catalyst dissolved $AlCl_3$ or $AlBr_3$, and then recovering a dichloro or dibromo alkyldecahydronaphthalene product in which the two halogen atoms are attached to the nucleus. The products have utility as intermediates for preparing difunctional derivatives, e.g. diacids, dialcohols or diamides, which are useful as monomers in polymer manufacture, or diesters which are useful as plasticizers in polyvinyl chloride.

CROSS REFERENCE TO RELATED APPLICATIONS

This application is a continuation-in-part of my copending application Ser. No. 702,789, filed Feb. 5, 1968, now Pat. No. 3,485,880, issued Dec. 23, 1969, which discloses and claims a process for polychlorinating or polybrominating $C_{10}$–$C_{20}$ adamantane hydrocarbons at bridgehead positions in the adamantane nucleus. The procedure involves reaction of the feed hydrocarbon under homogeneous conditions with a $C_4$–$C_5$ tertiary alkyl chloride or bromide, using as catalyst dissolved $AlCl_3$ or $AlBr_3$. The present process utilizes a similar procedure for dihalogenating alkyldecahydronaphthalenes.

My copending application Ser. No. 883,579, filed Dec. 9, 1969, involves a similar procedure for the dihalogenation of alkylcyclohexanes; my copending applications Ser. No. 883,580, filed Dec. 9, 1969, and Ser. No. 887,377, filed Dec. 22, 1969, involve an analogous procedure for the dihalogenation of certain types of branched alkanes and of perhydropolyphenyl hydrocarbons, respectively and my copending application Ser. No. 886,796, filed Dec. 19, 1969, likewise involves the utilization of a similar procedure for the mono- and dihalogenation of fused ring polycyclic perhydroaromatics.

BACKGROUND OF THE INVENTION

This invention relation to the conversion of alkyldecahydronaphthalenes containing 1–6 unbranched alkyl groups of the $C_1$–$C_3$ range into dihalogenated derivatives in which the halogen is chlorine or bromine. The halogenating agent is a $C_4$–$C_5$ tertiary alkyl chloride or bromide. The products are dichloro or dibromo alkyldecahydronaphthalenes having the same number of carbon atoms as the starting material and containing the halogen atoms as substituents on the nucleus. These products have utility as intermediates for preparing difunctional derivatives, e.g., diacids, dialcohols or diamides, which are useful as monomers in polymer manufacture, or diesters which are useful as plasticizers in polyvinyl chloride.

Hydrogen-halogen exchange reactions between a tertiary alkyl halide, such as t-butyl chloride, and various hydrocarbons containing one or more tertiary hydrogen atoms have been described, for example, by C. W. Kruse, Preprints, ACS Pet. Div., vol. 12, No. 2, Advances in Petrochemical Symposium, Miami Beach, Fla. (April 1967). In the described process an aluminum chloride complex was used for effecting the reaction, which was conducted at room temperature, and monochlorination of such feed materials as methylcyclohexane and 2,3-dimethylbutane was disclosed. The reaction system was heterogeneous and no dichloride product was formed.

Condon U.S. Pat. 2,629,748, dated Feb. 24, 1953, discloses the monochlorination of cis-Decalin in similar manner in a non-homogeneous reaction system. This patent teaches that trans-Decalin is largely inert under the process conditions and it does not show the formation of any dichloride products from the reactive isomer.

Other hydrogen-halogen exchange reactions between tertiary butyl chloride and various hydrocarbons using aluminum trichloride as catalyst have been described in the following U.S. patents:

| Patentee | Patent No. | Issue date |
|---|---|---|
| Schmerling | 2,448,156 | Aug. 31, 1948 |
| Condon | 2,646,453 | July 21, 1953 |
| Schneider et al | 2,742,507 | Apr. 17, 1956 |
| Gerzon | 3,096,372 | July 2, 1963 |
| Mahan et al | 3,230,269 | Jan. 18, 1966 |
| Kruse et al | 3,247,277 | Apr. 19, 1966 |

The reaction conditions taught in these references generally are such that the reaction system is heterogeneous, comprising a hydrocarbon phase and a catalyst phase. None of these references teaches the preparation of dihaloalkyldecahydronaphthalenes by means of a hydrogen-halogen interchange reaction.

SUMMARY OF THE INVENTION

The present invention provides a process for utilizing the hydrogen-halogen interchange reaction to convert alkyldecahydronaphthalenes into dihalo derivatives. The starting hydrocarbons have the following characteristics: (1) they are alkyldecahydronaphthalenes in which the ring junction positions are unsubstituted; and (2) they have one to six alkyl substituents at other positions on the nucleus which substituents are methyl, ethyl or n-propyl or any combination thereof. The procedure involves a hydrogen-halogen interchange reaction between one or more of such alkyldecahydronaphthalenes and a $C_4$–$C_5$ tertiary alkyl chloride or bromide, promoted by means of $AlCl_3$ or $AlBr_3$ in solution. The reaction is carried out at a relatively low temperature, viz in the range of —30° C. to 20° C., and conditions are such that a homogeneous reaction mixture is maintained.

I have now found that the presence of one or more alkyl substituents, as above defined, permits dihalogenation of the decahydronaphthalene nucleus to be readily effected by a hydrogen-halogen interchange reaction, provided that certain reaction conditions are established. These conditions entail maintaining the reaction system in substantially homogeneous state during the reaction, with the aluminum trihalide catalyst being in solution in the reactant mixture.

The process of the invention comprises the following steps:

(a) forming a solution of (1) an alkyldecahydronaphthalene having 1–6 unbranched alkyl substituents containing 1–3 carbon atoms each and located on the nucleus at positions other than ring junctions, and (2) a $C_4$–$C_5$ tertiary alkyl halide in which the halogen is chlorine or bromine in molar ratio to the alkyldecahydronaphthalene of at least 1:1 and preferably in excess of 2:1, said solution being capable of dissolving and maintaining therein the aluminum trihalide hereinafter specified;

(b) maintaining said solution at a temperature in the range of —30° C. to 20° C. while admixing therewith and dissolving therein an aluminum trihalide in which the halogen is the same as that in the tertiary halide, the weight ratio of aluminum trihalide to the tertiary halide being sufficient to promote dihalogenation of said alkyldecahydronaphthalene;

(c) maintaining the resulting solution within said temperature range and in homogeneous phase until at least substantial dihalogenation of the alkyldecahydronaphthalene has ocurred;

(d) and recovering from the reaction mixture a dihalogenated alkyldecahydronaphthalene product in which the two halogen atoms are attached to the nucleus.

DESCRIPTION

For convenience, the term "decahydronaphthalene" herein is sometimes abbreviated as "DHN."

As a specific illustration of the process, 10 parts (by weight) of an isomeric mixture of tetramethyl DHNs are dissolved in 100 parts of teritary butyl bromide, the solution is cooled to —5° C. and 2 parts of $AlBr_3$ powder are mixed into and dissolved in the solution. The mixture is stirred at —5° C. for 30 minutes, during which time isobutane is formed and partly evolves. Then $AlBr_3$ in amount of 2 parts again is added and mixing is continued at —5° C. for 30 minutes more. The mixture remains essentially homogeneous, no separate catalyst complex phase being formed. The mixture is then washed with water to remove the inorganic material and fractionally distilled. A dibromoinated product fraction is recovered which is a mixture of isomers in which the bromine atoms are substituted on the DHN nucleus.

As a further specific illustration, a $C_{14}$–$C_{16}$ mixture of dialkyl DHN's in which the alkyl groups are ethyl and n-propyl, prepared by alkylating naphthalene with a mixture of ethyl chloride and n-propyl chloride, separating the $C_{14}$–$C_{16}$ alkylate fraction and completely hydrogenating same, is used as feed. This $C_{14}$–$C_{16}$ feed in amount of 10 parts (by weight) is dissolved in a mixture of 40 parts of t-butyl chloride and 40 parts of methylene chloride, the solution is agitated at about 0° C., one part of $AlCl_3$ powder is dissolved therein and mixing is continued for one hour. After this, $AlCl_3$ is added twice again each time in the same amount as before, and the mixture is agitated for one hour at 0° C. after each addition. All of the catalyst goes into and remains in solution during the reaction. Water washing followed by fractional distillation of the reaction mixture yields a dichlorodialkyl DHN fraction as one of the products. The chlorine atoms are all attached to the DHN nucleus and are located both at secondary and tertiary carbon atoms. In this illustration the methylene chloride does not enter into the reaction, serving merely as an inert solvent.

The halogenating agent for practicing the invention must be a $C_4$ or $C_5$ tertiary alkyl chloride or bromide or, in other words, t-butyl or t-amyl chloride or bromide. Primary or secondary halides are not suitable, for these will not react in the manner desired. Also it is essential for purposes of the present invention that a low reaction temperature, i.e., in the range of —30° C. to 20° C., be used, since at higher temperatures cracking reactions will occur causing sludge to precipitate and the desired dihalo derivatives will not be produced in substantial amounts. Preeferably a reaction temperature in the range of —10° C. to 10° C. is employed.

It is also important in the present process that the reaction mixture comprising the alkylDHN and the $C_4$–$C_5$ tertiary alkyl halide be capable of dissolving and maintaining in solution therein all of the $AlCl_3$ or $AlBr_3$ added. In other words, conditions must be such as to maintain substantially the entire reaction mixture as a single phase and avoid the formation of a separate catalyst complex phase. The preferred way of establishing and maintaining a homogeneous system is to utilize a considerable excess of the tertiary alkyl halide over the stoichiometric amount required for the desired degree of dihalogenation. When the $AlCl_3$ or $AlBr_3$ is added to the mixture, it reacts with the tertiary alkyl halide to form a complex and this complex must remain at least mainly in solution. The precise function of the complex is not known with certainty and it may be that at least part of it acts as the catalytic species. However, it is considered more probable that dissolved $AlCl_3$ or $AlBr_3$ is the catalytic agent and that, at least in the case of $AlCl_3$, the complex formed is necessary for bringing the $AlCl_3$ into solution. In any event, sufficient excess tertiary alkyl halide should be present to act as solvent for this catalyst complex and keep it in solution. Otherwise, if a homogeneous reaction mixture is not maintained and the catalyst complex forms a separate phase, substantial dihalogenation will not be achieved.

For example, when a dimethylDHN is to be reacted with t-butyl chloride without the aid of an inert solvent to give dichloro product, a substantial excess of t-butyl chloride over a 2:1 molar ratio should be used so that the aluminum chloride complex will remain in solution. Typically a molar ratio of t-butyl chloride to dimethylDHN above 3:1, e.g., in the range of 4:1 to 20:1, can be employed to maintain a homogeneous solution. For dichlorination or dibromination of other starting hydrocarbons without an inert solvent, analogous ratios of reactants are employed. In all cases the presence of t-butyl chloride in substantial excess tends to inhibit isomerization of the feed material.

Another manner of practicing the invention to maintain homogeneity of the reaction mixture is to employ the $C_4$–$C_5$ tertiary alkyl halide in a lower proportion, and additionally to use an inert halogenated solvent to keep in solution the complex formed between the tertiary alkyl halide and $AlCl_3$ or $AlBr_3$. In such case the tertiary alkyl halide can be used in the stoichiometric 2:1 molar ratio, or even in a ratio as low as 1:1 although this is not preferred, as long as sufficient inert solvent is employed. Certain halogenated hydrocarbons are inert under conditions used in the process and will not themselves react with the aluminum trihalide to form a complex. These can be used as solvent to maintain the reaction mixture in homogeneous phase. Halogenated hydrocarbons which are suitable for this purpose include the following: methylene chloride; 1,1,2,2 - tetrachloroethane; pentachloroethane; and the bromine homologues of each of the foregoing solvents. This manner of practicing the invention is not, however, generally preferred since it requires an additional component in the reaction system, and it is usually preferably merely to use an excess of the $C_4$–$C_5$ tertiary alkyl halide as solvent and thus dispense with the need for an inert halogenated solvent.

The hydrocarbon feed can be one or more alkylDHNs having one to six, inclusive, unbranched alkyl groups of the $C_1$–$C_3$ range. In other words, these substituents can be methyl, ethyl or n-propyl, or any combination of these alkyl groups. However, the alkyl substituents should be located on the DHN nucleus at positions other than ring junctions, i.e. other than the 9,10-positions. Gem substitution of the alkyl groups on the nucleus of the starting hydrocarbon is permissible. Any alkylDHNs as here defined can be dichlorinated or dibrominated in the present process to yield dihalo products. Methyl-substituted DHNs of the $C_{11}$–$C_{14}$ range are preferred starting materials in view of availability as hereinafter discussed. In the case of singly substituted alkylDHN's a considerable proportion of the dihalo product generally will have one halogen atom attached to the same carbon atom to which the alkyl group is attached. For doubly substituted alkylDHN's a substantial amount of the dihalo product will have the halogen atoms attached to the same nuclear carbon atoms to which the two alkyl substituents are also attached, but isomeric products in which at least one of the halogen atoms is attached to a secondary carbon atom of the nucleus generally are also obtained. The spacing of alkyl groups in the product will not necessarily be the same as in the starting alkylDHN and at least part of the dihalo product usually will have its alkyl groups arranged on the nucleus differently from the original arrangement.

Alkyldecahydronaphthalenes suitable for use as feed in the present process can be derived from alkylnaphthalenes present in catalytic gas oil fractions. A suitable catalytic gas oil fraction, for example, one containing alkylnaphthalenes of the $C_{11}$–$C_{14}$ range, can be extracted in the manner described in Hagerty et al. U.S. Pat. No. 3,172,919, dated Mar. 9, 1965, to separate the non-aromatic from the aromatic components, and the resulting aromatic product or any desired fraction thereof can be fully hydrogenated by known hydrogenation procedures to yield the corresponding alkyldecahydronaphthalenes. Materials obtained in this manner are mainly methyl-substituted DHN's containing 1–4 methyl substituents.

Ethyl-substituted and n-propyl-substituted DHN feedstocks can be obtained by alkylating naphthalene in known manner by means of ethyl chloride or n-propyl chloride, or the corresponding alcohols, and then completely hydrogenating the alkylation product. Feedstocks containing mixed alkyl substituents can be obtained by reacting methyl-substituted naphthalenes in this manner or by alkylating naphthalene with a mixture of alkylating agents containing any combination of methyl, ethyl and n-propyl groups.

The following are some examples of hydrocarbons which are suitable as feed material for the present process. It is to be understood that the alkyl substituents, aside from not being at the ring junction positions, can be located at any of the other positions on the DHN nucleus and that specific positions of substitution are not important for operability of the process. Furthermore, these feed hydrocarbons can be in either cis or trans form and the positions of the alkyl substituents with respect to the DHN nucleus can be axial or equatorial.

Singly substituted alkyl DHN's: 1- or 2-methylDHN; 1- or 2-ethylDHN; and 1- or 2-n-propylDHN.

Doubly substituted alkylDHN's; 1,1-, 1,2-, 1,3-, 1,4-, 1,5-, 1,6-, 1,7-, 1,8-, 2,2-, 2,3-, 2,6- or 2,7-dimethylDHN's; diethylDHN's or di-n-propylDHN's analogous to the foregoing dimethyl isomers; methylethyl or methyl-n-propyl or ethyl-n-propylDHN's with the two alkyl substituents at any of the nuclear positions other than 9 and 10.

Other alkyl DHN's having the following substitutional arrangements: 1,1,3- or 1,1,6- or 1,2,3- or 1,2,4- or 1,2,5- or 1,2,7- or 1,3,5- or 2,3,5- or 2,3,6- or 2,2,4- or 2,2,5- or 2,2,6-trialkylDHN's with the three alkyl groups being any combination of methyl ethyl and/or n-propyl radicals; tetraalkylDHN's like the foregoing trialkyl compounds having one more methyl, ethyl or n-propyl substituent attached to any nuclear carbon atom other than those at the 9 and 10 positions; and analogous pentaalkyl and hexaalkyl DHN's.

The following equation illustrates the reaction, starting, for example, with t-butyl chloride and 2,6-dimethylDHN in which the ring fusion is trans and the methyl groups are axial (most hydrogen atoms being omitted, for convenience):

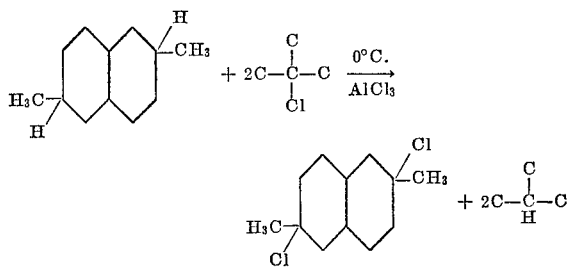

The products of the reaction, as shown, are 2,6-dichloro-2,6-dimethylDHN and isobutane. This dichloro compound is favored kinetically and also thermodynamically and will constitute the dichloro isomer produced in largest amount. However smaller amounts of isomeric dichloro products generally also will be formed, including isomers resulting from shifting of positions of chlorine atoms as well as methyl groups. Besides containing these dichloro compounds the final reaction mixture will include mixed monochlorinated products usually including both secondary and tertiary monochlorides.

In the foregoing equation the positions of the methyl groups in the main dihalo product are shown to be the same as in the starting alkylDHN, but this would not necessarily be the case for other dimethylDHN isomers. Considerable shifting of positions of alkyl groups on the nucleus can occur depending upon how much t-butyl chloride is present and how much aluminum trihalide is used in conducting the reaction. The tendency is for the kinetic dichloro product first obtained to isomerize to an equilibrium mixture of dichlorodimethylDHN's if enough $AlCl_3$ is added to the reaction mixture, and this involves shifting of the alkyl groups as well as the chlorine atoms. When other alkylDHN's as herein defined are used as starting material, isomerization of the kinetic dihalo products first formed toward an equilibrium composition of dihalo isomers similarly can take place.

When the starting alkylDHN has only one alkyl substituent, dihalogenation of the nucleus likewise will readily occur under conditions of the present process. A major portion of the dihalo product generally will have one of the halogen substituents attached to the same nuclear carbon atom as the alkyl group but a substantial amount of isomeric product in which both halogens are at secondary positions usually will also be present.

In some cases a high boiling dimeric material is observed in the reaction product, as can be seen in Tables IV and V presented infra, but the amount thereof is relatively small.

A preferred way of carrying out the invention utilizing an excess of tertiary alkyl halide as solvent is given in the following description using t-butyl chloride as the tertiary halide and $AlCl_3$ as catalyst. The starting alkylDHN is dissolved in the t-butyl chloride, using, for example, between 5 and 15 moles of t-butyl chloride per mole of the alkylDHN, and the mixture is cooled to 0° C. While the mixture is being well agitated, $AlCl_3$ is added thereto in amount usually between 1.5 and 20 parts by weight per hundred parts of t-butyl chloride. In some cases it may be advantageous to add the $AlCl_3$ in incremental amounts throughout a time of 10–60 minutes in order to more easily control reaction conditions such as temperature and rate of gas evolution. However, if control of the reaction presents no problem, substantially the same results can be obtained by adding all of the required amount of $AlCl_3$ at once.

When an amount of $AlCl_3$ is added, it goes into solution and forms with the t-butyl chloride a complex which remains in solution. As previously mentioned, the complex formed may act as solvent for uncomplexed $AlCl_3$ which, when brought into solution, functions as the catalytic agent. This promotes the hydrogenchlorine exchange reaction. Also a slow evolution of HCl generally occurs indicating some side reaction, and the catalyst activity concurrently declines until the reaction ceases. Addition of a further amount of $AlCl_3$ will then result in more solubilized catalyst and further promote the hydrogen-chlorine exchange reaction until the catalyst activity again diminishes. The procedure of adding incremental amounts of $AlCl_3$ can be continued to promote the exchange reaction until an optimum degree of dichlorination has been reached. Alternatively, all of the $AlC_3$ needed can be added at the beginning provided that the reaction does not proceed so fast as to get out of control. Removal of isobutane from the system as it is formed will expedite the hydrogen-halogen exchange reaction.

The amount of $AlCl_3$ or $AlBr_3$ that should be used depends mainly upon the amount of tertiary alkyl halide in the mixture and the reaction temperature selected within the specified range of −30° C. to 20° C. The higher the reaction temperature the greater is the tendency of the $AlCl_3$ or $AlBr_3$ to be consumed in side reactions and the more that will be required. Preferably, the weight proportion of total aluminum trihalide to tertiary alkyl halide should be in excess of 1.5:100 and sufficiently in excess of this ratio to maximize yield of the dihalogenation product. Side reactions can be inhibited my maintaining a pressure of hydrogen chloride in the reaction system, e.g. by maintaining a partial pressure of HCl in the range of 50–100 p.s.i.

When the reaction has been completed, the mixture can be washed with water to remove the catalyst residues and then the dihalogenated product can be separated from the other components in any suitable manner, for example, by fractional crystallization or distillation.

The dibromo or dichloro alkylDHN's produced by the present invention are useful as intermediates for preparing monomers suitable for making various types of polymers such as polyesters or polyamides. For example, dihalo-alkylDHN's can be reacted in the presence of strong sulfuric acid with formic acid [see Koch et al., Liebig's Annalen der. Chemie, 618 (1958), 251–266] to produce corresponding diacids, or with HCN or nitriles [analogous to Ritter reaction, JACS, 70 (1948), 4045–4048] to form corresponding diamides. Dialcohols, also useful as monomers, can be made by esterifying the diacids and hydrogenating the resulting diesters. Such diacids and dialcohols can be used, for example, to make copolymers analogous to those shown in Caldwell et al. U.S. Pat. 2,891,930, issued June 23, 1959, which describes the use of 1,4-cyclohexanedicarboxylic acid and various diols for preparing polyesters. Such diacids also can be esterified to yield diesters which are particularly useful as plasticizers for polyvinyl chloride resins. For example, mixed dihalo products obtained from the above referred to $C_{11}$–$C_{14}$ material derived from catalytic gas oil can be converted to diacids by the Koch reaction and the diacids then can be esterified, e.g. with octyl alcohol, to form a diester product useful as a plasticizer for polyvinyl chloride.

The following examples are specific illustrations of the invention. In the tables accompanying the examples the total amount of $AlCl_3$ that has been used up to the time of each sampling is indicated in terms of g. $AlCl_3$ per 100 g. of t-butyl chloride employed.

EXAMPLE I

This example illustrates the reaction of a non-equilibrium mixture of methylDHN's with t-butyl chloride. The feed was a non-equilibrium mixture of isomers prepared by completely hydrogenating a mixture of α- and β-methylnaphthalene using a Raney nickel catalyst under mild conditions. A solution of 1.00 g. (0.0066 mole) of the hydrocarbon feed, 3.00 g. (0.0323 mole) of t-butyl chloride and 4.0 ml. of methylene chloride was stirred at 0° C. and about 0.04 g. of $AlCl_3$ powder was added. The mole ratio of t-butyl chloride to feed was 4.0. The $AlCl_3$ dissolved and a homogeneous, light yellow solution was immediately formed. The mixture was stirred at 0° C. for 11 minutes and then was allowed to stand for 9 minutes more, after which a 1.0 ml. sample was taken. This sample was diluted with 10 ml. of pentane to precipitate a small amount of catalyst complex which was separated. The hydrocarbon layer was water washed and dried with potassium carbonate, and the pentane was then evaporated to give a sample for analysis (Cut 1). To the remainder of the reaction mixture, about 0.04 g. of $AlCl_3$ again was added and mixing was continued at 0° C. for 15 minutes more. The reaction mixture was then diluted with pentane to precipitate catalyst complex and was worked up in the same way as for Cut 1 to give another sample (Cut 2) for analysis. The reaction mixture was essentially homogeneous during the entire reaction period. Each of the samples was analyzed by GLC. Results are shown in Table I and are given in weight percent on a t-butyl chloride-free and methylene chloride-free basis.

TABLE I

Reaction of non-equilibrated methylDHNs (mole ratio of t-butyl chloride:feed=4.9)

| | Cut 1 | Cut 2 |
|---|---|---|
| Total reaction time, minutes | 20 | 35 |
| Grams $AlCl_3$/100 g. t-butyl chloride | 1.3 | 2.8 |
| Product composition, weight percent: | | |
| MethylDHN | 6.8 | 4.4 |
| MethylDHN tertiary monochlorides | 43.6 | 25.0 |
| MethylDHN secondary monochlorides | 26.3 | 21.1 |
| MethylDHN dichloride I * | 9.0 | 11.2 |
| MethylDHN dichlorides II ** | 14.2 | 38.2 |

* I was a single compound, viz, 2,10-dichloro-2-methyl-trans-decahydronaphthalene, with both chlorine atoms axial and the methyl group equatorial.
** II was a mixture of close boiling dichloro isomers, boiling appreciably above I.

Table I shows that dichlorides can readily be formed from methylDHN's under the homogeneous reaction conditions used in the present process. The maximum amount of dichlorides obtained in this case was about 49% (Cut 2). As noted in Table I, these included a single isomer (I) which first appeared as a peak on the chromatograph and other isomeric dichlorides (II) which were somewhat higher boiling. The latter were sufficiently close boiling to each other that they appeared as one large peak in the chromatograph.

EXAMPLE II

Another run was made using the same kind of non-equilibrium mixture as used as feed in Example I, but in this case a substantially lower mole ratio (viz 1.7) of t-butyl chloride to the feed was used. More specifically, a mixture of 1.06 g. (0.0069 mole) of the feed, 1.10 g. (0.0119 mole) of t-butyl chloride and 4.0 ml. of methylene chloride was prepared and cooled to 0° C. While the mixture was being stirred at 0° C., four increments of $AlCl_3$ powder in amount of 0.03 g. each were added at reaction times of 0, 1, 2 and 10 minutes, following which the mixture was stirred for an additional ten minutes at 0° C. The mixture was then diluted with pentane, causing catalyst complex to precipitate. The final hydrocarbon phase was water washed and dried and after evaporation of the pentane was analyzed by GLC, giving the results in Table II.

TABLE II

Reaction of non-equilibrated methylDHN's
(mole ratio of t-butyl chloride:feed=1.7)

| | |
|---|---|
| Total reaction time, min. | 20 |
| g. $AlCl_3$/100 g. t-butyl chloride | 10.9 |
| Product Composition, wt. percent: | |
| MethylDHN | 20.2 |
| MethylDHN tertiary monochlorides | 30.2 |
| MethylDHN secondary monochlorides | 30.2 |
| MethylDHN dichloride I | 4.7 |
| MethylDHN dichlorides II | 14.7 |

A comparison of the results of Tables I and II shows the effect of changing the mole ratio of t-butyl chloride to feed hydrocarbon. The dichloro products formed were the same in each example but substantially less were produced when the lower ratio (1.7) was used. Table II shows that the total amount of dichloro product obtained at the lower ratio was about 19%, compared to about 49% for Example I. This indicates the desirability of carrying out the process using a t-butyl chloride:feed ratio substantially above 2:1.

EXAMPLE III

This example illustrates the adverse effect of using a still lower mole ratio of t-butyl chloride:feed, viz a ratio of 0.56. The feed material in this case was an equilibrium mixture of methylDHN's prepared by contacting a methylene chloride solution of the non-equilibrium feed material used in the preceding examples with AlCl$_3$ at 0° C. in the absence of t-butyl chloride. The equilibrated methylDHN's were composed almost entirely of trans isomers, with the methyl group being in equatorial position. The chlorination reaction was carried out by contacting 1.00 g. of the equilibrated methylDHN isomers, dissolved in 4.0 ml. of methylene chloride, together with 0.3 g. (0.004 mole) of t-butyl chloride at 0° C. with about 0.03 g. of AlCl$_3$ for 21 minutes, after which a sample was taken and worked up as in the preceding examples (Cut 1). About 0.03 g. of additional AlCl$_3$ was added and the mixture was stirred at 0° C. for 12 minutes more, following which another sample was taken (Cut 2). AlCl$_3$ in amount of 0.03 g. was again added and the mixture was stirred for 10 more minutes and another sample was taken (Cut 3). Results are shown in Table III.

TABLE III

Reaction of equilibrated methylDHN's (mole ratio of t-butyl chloride:feed=0.56)

|  | Cut 1 | Cut 2 | Cut 3 |
| --- | --- | --- | --- |
| Total reaction time, minutes | 21 | 33 | 40 |
| Grams AlCl$_3$/100 g. t-butyl chloride | 8.1 | 17.3 | 27.7 |
| Product composition, weight percent: |  |  |  |
| MethylDHN | 60.0 | 40.7 | 54.3 |
| MethylDHN secondary monochlorides | 25.8 | 14.3 | 20.3 |
| MethylDHN tertiary monochlorides | 12.3 | 27.7 | 20.5 |
| MethylDHN dichlorides | 1.9 | 7.3 | 4.9 |

The data of Table III indicate that substantial amounts of dichloride products are not obtainable if the t-butyl chloride:feed ratio is too low as here.

EXAMPLE IV

This example illustrates the reaction of t-buyl chloride with a dimethylDHN feed at a mole ratio of 4.0. The feed in this case was an equilibrated mixture of dimethylDHN isomers. The starting reaction mixture was composed of 1.00 g. (0.0060 mole) of the equilibrated isomers, 2.22 g. (0.024 mole) of t-butyl chloride and 4.0 ml. of methylene chloride, corresponding to a mole ratio of t-butyl chloride to feed of 4.0. The reaction temperature was maintained at 0° C. and the procedure was similar to that of the preceding examples, with additions of AlCl$_3$ being made at various times followed by reaction times as shown in Table IV. The samples were worked up and analyzed as in the previous examples.

TABLE IV

Reaction of equilibrated dimethylDHN's (mole ratio of t-butyl chloride: feed=4.0)

|  | Cut 1 | Cut 2 | Cut 3 |
| --- | --- | --- | --- |
| Total reaction time, minutes | 10 | 29 | 42 |
| Grams AlCl$_3$/100 g. t-butyl chloride | 2.3 | 4.9 | 8.0 |
| Product composition, weight percent: |  |  |  |
| DimethylDHN | 9.2 | 8.8 | 8.4 |
| Unknown | 2.8 | 4.3 | 4.2 |
| DimethylDHN monochlorides | 42.8 | 40.8 | 44.1 |
| DimethylDHN dichlorides | 44.0 | 43.7 | 41.7 |
| Dimer product | 1.2 | 2.4 | 1.6 |

The data of Table IV show that dimethylDHN's can be converted into dichloroproducts in good yield under conditions of the present process. In this case the maximum amount of dichlorides was 44% corresponding to Cut 1, and further additions of AlCl$_3$ caused the amount of dichlorides to decrease in the reaction product. This indicates that there is an optimum amount of AlCl$_3$ to use in each case and that additions of AlCl$_3$ beyond the optimum amount have an adverse effect.

EXAMPLE V

This example shows the reaction of the same feed material as in Example IV, but in this case the t-butyl chloride:feed mole ratio was reduced to 1.2. The reaction mixture was composed of 1.00 g. (0.0060 mole) of equilibrated dimethylDHN's, 0.67 g. (0.0072 mole) of t-butyl chloride and 4.0 ml. of methylene chloride. The reaction was carried out at 0° C. in essentially the same manner as the preceding example. The amounts of AlCl$_3$ used, the reaction times and compositions of reaction products are shown in Table V.

TABLE V

Reaction of equilibrated dimethylDHN's (mole ratio of t-butyl chloride: feed=1.2)

|  | Cut 1 | Cut 2 | Cut 3 |
| --- | --- | --- | --- |
| Total reaction time, minutes | 15 | 42 | 67 |
| Grams AlCl$_3$/100 g. t-butyl chloride | 4.5 | 9.9 | 16.8 |
| Product composition, weight percent: |  |  |  |
| MethylDHN | 0.3 | 0.6 | 0.6 |
| DimethylDHN | 29.3 | 28.9 | 40.2 |
| Unknown | 0.6 | 5.1 | 4.5 |
| DimethylDHN monochlorides | 55.4 | 46.5 | 40.7 |
| DimethylDHN dichlorides | 13.2 | 13.7 | 8.1 |
| Dimer product | 1.2 | 5.2 | 5.9 |

While the data given in Table V indicate that substantial yields of the dichlorides can be obtained when the t-butyl chloride:feed ratio is just above 1:1 (in this case 1.2), a comparison with the results of Table IV shows that it is distinctly better to use a considerably higher mole ratio of these reactants. Table V also indicates that there is an optimum amount of AlCl$_3$ to use for any set of the reaction conditions. In this case the optimum corresponded to Cut 2, and it is noted that the dichloride content was reduced by the addition of more AlCl$_3$ (Cut 3). It is also noted that the amount of dimethylDHN's increased between Cuts 2 and 3 instead of decreasing. This effect, which can also be noted between Cuts 2 and 3 in Table III supra, is a further indication that the optimum amount of AlCl$_3$ has been exceeded.

EXAMPLE VI

The feed material in this example was a non-equilibrium mixture of dimethylDHN's which had been prepared by dimerizing methylcyclopentane by means of sulfuric acid. The mixture was mainly composed of cis-dimethylDHN isomers. This material was reacted using the same proportions of reactants and solvent as described in Example IV and under similar reaction conditions, employing amounts of AlCl$_3$ and reaction times as shown in Table VI.

TABLE VI

Reaction of non-equilibrated dimethylDHN's (mole ratio of t-butyl chloride:feed=4.0)

|  | Cut 1 | Cut 2 | Cut 3 |
| --- | --- | --- | --- |
| Total reaction time, minutes | 10 | 28 | 45 |
| Grams AlCl$_3$/100 g. t-butyl chloride | 2.3 | 4.9 | 9.9 |
| Product composition, weight percent: |  |  |  |
| DimethylDHN | 20.6 | 8.9 | 8.4 |
| DimethylDHN monochlorides | 73.3 | 61.1 | 50.9 |
| DimethylDHN dichlorides | 6.1 | 29.9 | 40.3 |

The data in Table VI show that the dichloride content of the reaction product increased with each addition of AlCl$_3$ and that the optimum amount thereof was not exceeded under the conditions of this run. The maximum dichloride content reached in this case was about 40% (Cut 3).

Analogous results are obtained when other alkylDHN's as herein specified are substituted for the feed hydrocarbons used in the foregoing examples. As a general rule, an increase in the number of alkyl substituents on the DHN nucleus tends to make its dichlorination take place more readily. Likewise essentially equivalent results are obtained when tertiary butyl bromide with AlBr$_3$ as catalyst is used in place of the tertiary chloride. The halogenation reaction also proceeds in essentially the same manner when tertiary amyl chlorides or bromides are used, but in such cases more side reactions tend to occur.

The invention claimed is:

1. Process of preparing dihalogenated alkyldecahydronaphthalenes which comprises:
   (a) forming a solution of (1) an alkyldecahydronaphthalene having 1–6 unbranched alkyl substituents containing 1–3 carbon atoms each and located on the nucleus at positions other than ring junctions, and
   (2) a C$_4$–C$_5$ tertiary alkyl halide in which the halogen is chlorine or bromine in molar ratio to said alkyldecahydronaphthalene of at least 1:1, said solution being capable of dissolving and maintaining therein the aluminum trihalide hereinafter specified;

(b) maintaining said solution at a temperature in the range of −30° C. to 20° C. while admixing therewith and dissolving completely therein so as to form a homogeneous solution an aluminum trihalide in which the halogen is the same as that in said teritary halide, the weight ratio of aluminum trihalide to the tertiary halide being sufficient to promote dihalogenation of said alkyldecahydronaphthalene;

(c) maintaining the resulting solution within said temperature range and in homogeneous phase until at least substantial dihalogenation of said alkyldecahydronaphthalene has occurred;

(d) and recovering from the reaction mixture a dihalogenated alkyldecahydronaphthalene product in which the two halogen atoms are attached to the nucleus.

2. Process according to claim 1 wherein said $C_4$–$C_5$ tertiary alkyl halide is tertiary butyl chloride or bromide.

3. Process according to claim 2 wherein said temperature is in the range of −10° C. to 10° C.

4. Process according to claim 3 wherein said weight ratio of aluminum trihalide to the tertiary butyl halide is above 1.5:100.

5. Process according to claim 2 wherein said molar ratio of tertiary alkyl halide to alkyldecahydronaphthalene is in excess of 2:1.

6. Process according to claim 5 wherein the starting alkyldecahydronaphthalene contains a single alkyl substituent.

7. Process according to claim 6 wherein said weight ratio of aluminum trihalide to the tertiary butyl halide is above 1.5:100.

8. Process according to claim 7 wherein said temperature is in the range of −10° C. to 10° C. and the halogen in the teritary butyl halide and in the aluminum trihalide is chlorine.

9. Process according to claim 5 wherein the starting alkyldecahydronaphthalene is of the $C_{11}$–$C_{14}$ range and the alkyl substituents are methyl.

10. Process according to claim 9 wherein said temperature is in the range of −10° C. to 10° C., said weight ratio of aluminum trihalide to the tertiary butyl halide is above 1.5:100, and the halogen in the tertiary butyl halide and in the aluminum trihalide is chlorine.

11. Process according to claim 1 wherein said molar ratio of tertiary alkyl halide to alkyldecahydronaphthalene is in excess of 2:1 and said weight ratio of aluminum trihalide to the tertiary alkyl halide is above 1.5:100.

12. Process according to claim 11 wherein the tertiary halide is tertiary butyl bromide and the aluminum trihalide is $AlBr_3$.

13. Process according to claim 11 wherein the tertiary halide is tertiary butyl chloride and the aluminum trihalide is $AlCl_3$.

14. Process according to claim 13 wherein said temperature is in the range of −10° C. to 10° C.

15. Process according to claim 11 wherein the alkyldecahydronaphthalene feed is a mixture of methyldecahydronaphthalene isomers.

16. Process according to claim 11 wherein the alkyldecahydronaphthalene feed is a mixture of dimethyldecahydronaphthalene isomers.

References Cited

UNITED STATES PATENTS

| | | | |
|---|---|---|---|
| 2,629,748 | 2/1953 | Condon | 260—648 R |
| 3,096,372 | 7/1963 | Gerzon | 424—321 |
| 3,485,880 | 12/1969 | Schneider | 260—648 R |

OTHER REFERENCES

Foster, Inorganic Chemistry for Colleges, p. 279 (1936), 2nd edition.

DANIEL D. HORWITZ, Primary Examiner